(12) United States Patent
Clift

(10) Patent No.: US 6,213,542 B1
(45) Date of Patent: Apr. 10, 2001

(54) SEAL ARRANGEMENT

(75) Inventor: Nicolas Clift, Lighthorne (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/261,279

(22) Filed: Mar. 2, 1999

(30) Foreign Application Priority Data

Mar. 5, 1998 (GB) .................................................. 9804653

(51) Int. Cl.$^7$ .................................................. B60R 13/02
(52) U.S. Cl. .................................................. 296/214
(58) Field of Search .................. 296/214, 39.1; 52/DIG. 13, 511

(56) References Cited

U.S. PATENT DOCUMENTS

| 4,840,339 | 6/1989 | Grogan | 248/205.2 |
| 4,840,832 | * 6/1989 | Weinle et al. | 296/214 X |
| 4,923,245 | 5/1990 | Kuwabara | 296/214 |
| 5,280,991 | 1/1994 | Weiland | 296/214 |
| 5,516,183 | * 5/1996 | Gold | 296/146.15 |
| 5,667,896 | 9/1997 | Carter | 428/425.6 |

FOREIGN PATENT DOCUMENTS

| 35 27 541 | 2/1987 | (DE) . |
| 0 364 102 | 4/1990 | (EP) . |
| 2 115 754 | 9/1983 | (GB) . |
| 406166327 | * 6/1994 | (JP) .................................................. 296/214 |

OTHER PUBLICATIONS

"VELCRO Fastening Systems", Automotive Engineering, p. 64, Sep. 1976.*

* cited by examiner

Primary Examiner—Dennis H. Pedder
(74) Attorney, Agent, or Firm—Davis and Bujold

(57) ABSTRACT

A seal arrangement to retain a motor vehicle roof liner about a sunroof aperture of that vehicle's body. The arrangement comprises a hook and fleece coupling (15) secured with respective components of said coupling (15) attached to a roof liner and about the aperture (12) of the body (10). The coupling (15) allows a wider range of acceptable retention geometries for the liner (13) within the aperture (12) whilst avoiding a bespoke component to secure the liner (13) to the body (10). The liner (13) includes a flange edge (16) which preferably extends substantially beyond the aperture (12) in order to provide lateral location of the liner (13) within the aperture (12) and so facilitate motor vehicle assembly.

14 Claims, 2 Drawing Sheets

SEAL ARRANGEMENT

FIELD OF THE PRESENT INVENTION

Figure 4:
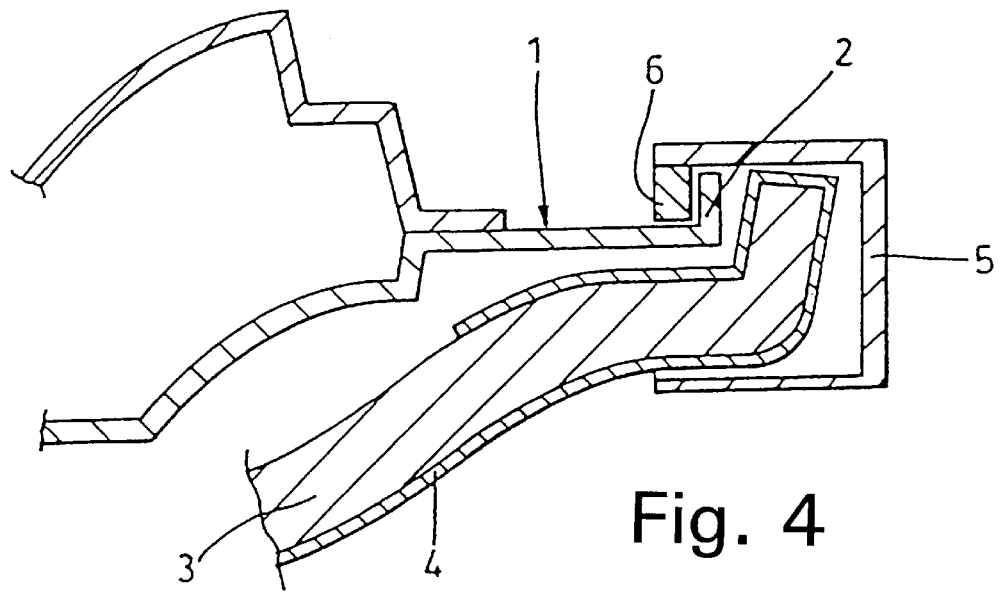

The present invention relates to a seal arrangement to retain a motor vehicle roof liner about a sunroof aperture of that vehicle's body.

BACKGROUND TO THE PRESENT INVENTION

Sunroofs are a popular feature within a motor vehicle to provide, in addition to extra visibility, a potential for greater ventilation. It will be appreciated that the sunroof aperture within a motor vehicle body must be appropriately sealed to the roof liner or head liner of that motor vehicle. Traditionally, the seal to secure the interface between the sunroof aperture and the head liner has been of a flocked flange or a specific injection-moulded plastic material part. These seals act as beading to grip the respective aperture edges and head liner edge and so secure them together.

It will be appreciated that the use of a dedicated flange seal or moulded part adds to component count and potentially to assembly problems. There are inherent geometric and subsequent vibrational problems within a motor vehicle. Thus, the method of securing the head liner about the sunroof aperture must be resilient whilst being relatively flexible for assembly purposes. It will be understood that a headliner within a motor vehicle is a relatively large panel. In such circumstances, specific alignment may be difficult to the desired degree of accuracy. These difficulties will be particularly apparent if apertures within the head liner and the body must be parallel with respect to edges aligned to accommodate a seal.

A typical prior sealing arrangement is depicted in the drawings under the reference title 'Prior Art'. It will be noted that a motor vehicle body 1 includes a sunroof aperture edge 2. A roof liner or head liner 3 is covered with a decorative fabric 4 which extends over a return edge of the liner 3. The liner 3, with fabric 4, is secured about the aperture 2 using a bespoke seal element 5 including a tufted or flocked edge 6. It will be appreciated that the liner 3 is retained about the aperture 2 under compression from the sealing element 5. In terms of assembly, locating the liner 3 appropriately relative to the aperture 2 although not difficult may be inconvenient. Furthermore, the necessity of a separate sealing component 5 adds to assembly problems in terms of process staging and component parts count.

OJECTIVE OF THE PRESENT INVENTION

It is an object of the present invention to provide a seal arrangement to retain a motor vehicle roof liner about a sunroof aperture of that vehicle's body which substantially avoids above-mentioned problems.

SUMMARY OF THE PRESENT INVENTION

In accordance with the present invention there is provided a seal arrangement to retain a motor vehicle roof liner about a sunroof aperture of that vehicle's body, the arrangement comprising flange edge means within said sunroof liner, said flange edge means being configured about said aperture and said flange edge means being adjacent one half of a hook and fleece coupling means whilst said other half of said coupling means is secured to said body about said aperture to retain said flange edge means in said configuration about said aperture to provide a proximity seal between said sunroof aperture and said roof liner.

The hook and fleece coupling may be that marketed under the trade mark Velcro.

The flange edge means may be configured to extend sufficiently beyond said aperture to provide location keying for said motor vehicle roof liner within the motor vehicle body and so facilitate assembly.

The hook and fleece coupling means may be located in a plane perpendicular to the sunroof aperture in order to provide a width of retention coupling for said roof liner within said aperture.

Said hook and fleece coupling means may be arranged such that at least a portion of said coupling means is in a direction perpendicular to said sunroof aperture in order to allow preliminary orientation of the flange edge means within said aperture and/or supplement the closeness of the proximity seal between said liner and said sunroof aperture.

BRIEF INTRODUCTION OF THE DRAWINGS

An embodiment of the present invention will now be described by way of example only with reference to FIG. 1 of the accompanying drawings, in which a schematic cross-section of a seal arrangement between a roof liner and a sun roof aperture of a motor vehicle body is depicted, FIG. 2 of the accompanying drawings is a schematic cross-section of a variation of the seal arrangement of FIG. 1, and FIG. 3 of the accompanying drawings is a schematic cross-section of a further variation of the seal arrangement of FIG. 1.

DESCRIPTION OF SPECIFIC EMBODIMENTS OF THE PRESENT INVENTION

Figure 1:
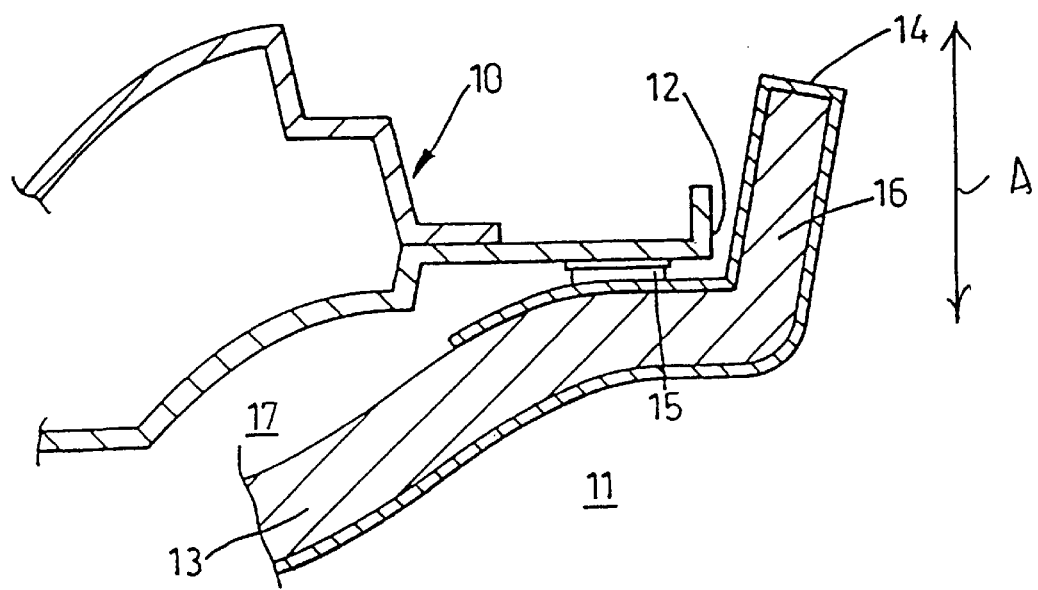
Figure 2:
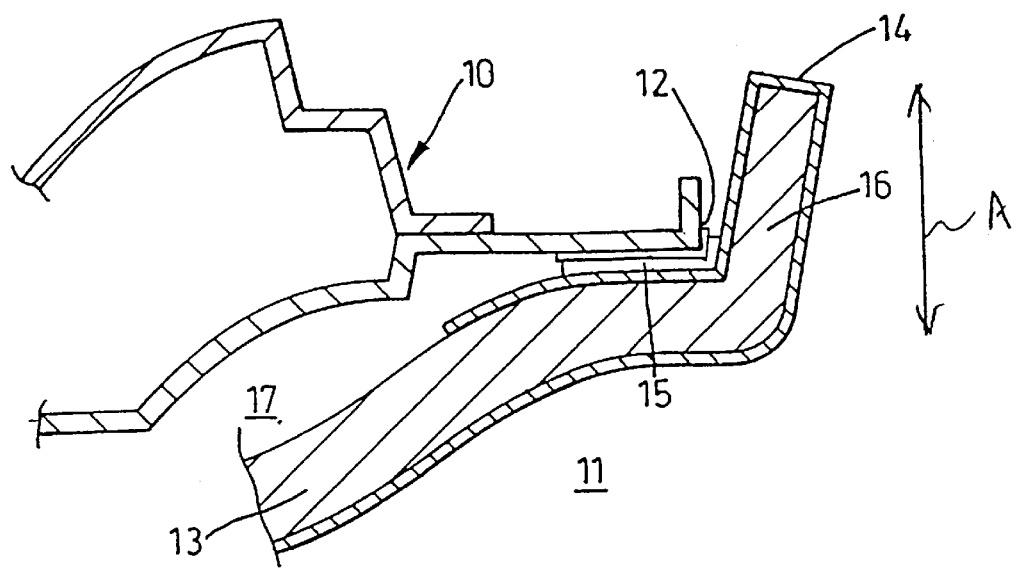

Referring to FIG. 1 of the drawings, it will be noted that a motor vehicle body 10 includes a sunroof aperture 12. A roof liner 13 is covered with a fabric 14 such that the aesthetically decorative fabric is presented to a motor vehicle interior 11.

A roof liner 13 with fabric cover 14 is retained about the aperture 12 using a hook and fleece (loop) adhesion coupling 15. Such hook and fleece adhesion coupling 15 arrangements are more commonly known as Velcro (trade mark) fixing systems. A hook and fleece coupling 15 is used due to its resilience and adaptability such that accurate alignment is not required provided there is sufficient overlap between the respective hook and fleece components of the coupling. Thus, in the present invention, the coupling 15 is preferably located such that, as depicted, it has a perpendicular aspect to the axis (A) of the aperture 12. In such circumstances, it will be appreciated that absolute alignment between the respective hook and fleece components of coupling 15 is not required. Thus, simple overlap of a sufficient proportion of these respective components will allow good retention between the liner 13 and body 10.

During motor vehicle assembly, normally the respective components of the hook and fleece coupling 15 will be secured to their respective body 10 and liner 13 prior to delivery to the motor vehicle manufacturing track. Thus, the operations of securing these hook and fleece components to their respective body 10 and liner 13 will be conducted away from motor vehicle assembly operations. In such circumstances, it will be appreciated the perpendicular aspect to the coupling 15 in terms of giving a wider range of overlap retention is beneficial. Thus, the tolerance requirements to secure respective coupling components is diminished and potentially almost eliminated if sufficiently wide strip coupling components are specified.

Further, in facilitating improved motor vehicle assembly, it will be appreciated that a portion of the hook and fleece coupling 15 could be provided in the axis of the aperture 12. Thus, there could be preliminary location of the liner 13 using this portion of the hook and fleece coupling 15 and subsequent location of the lining 13 with regard to other parts of the motor vehicle. Finally, pressure is applied to secure the liner 13 using using the alignment provided by the portion of the coupling 15 held in a perpendicular aspect to the aperture 12 described above. Such a situation could allow less mechanically stressed location of the liner 13 within a motor vehicle. In such circumstances, the vehicle interior 11 profile is less likely to include distortions in its smooth curvature due to mechanical stress upon the head liner.

Also in accordance with the present invention is the provision that a flange edge 16 of the liner 13, in addition to being about, also substantially extends through the aperture 12. Thus, the edge 16 is arranged to extend sufficiently beyond the aperture 12 in order to achieve lateral location keying for the liner 13 within the body 10. It will be appreciated, with the flange edge 16 extending well beyond the aperture 12, that lateral movement of the whole liner 13 relative to the aperture 12 is limited by the retention of the flange edge 16 within that aperture 12. Such lateral movement limitation generally facilitates good location for the liner 13 within the body and so motor vehicle manufacture.

In accordance with the present invention the retention of the liner 13 to the body 10 about the aperture 12 creates a proximity seal between the flange edge 16 and the aperture 12 surface. The gap between the aperture 12 and the flange edge 16 defines the closeness of the proximity seal but as indicated previously, such closeness can be improved by securing a portion of the hook and fleece adhesion coupling 15 between these opposed surfaces of the body 10 at aperture 12 and liner 13. FIG. 2 shows portion of the hook and fleece coupling extending in the direction of the aperture, between the flange edge and the aperture, in order to provide for preliminary location for the roof liner within the aperture and/or provide a closer proximity between the aperture and the roof liner.

Figure 3:
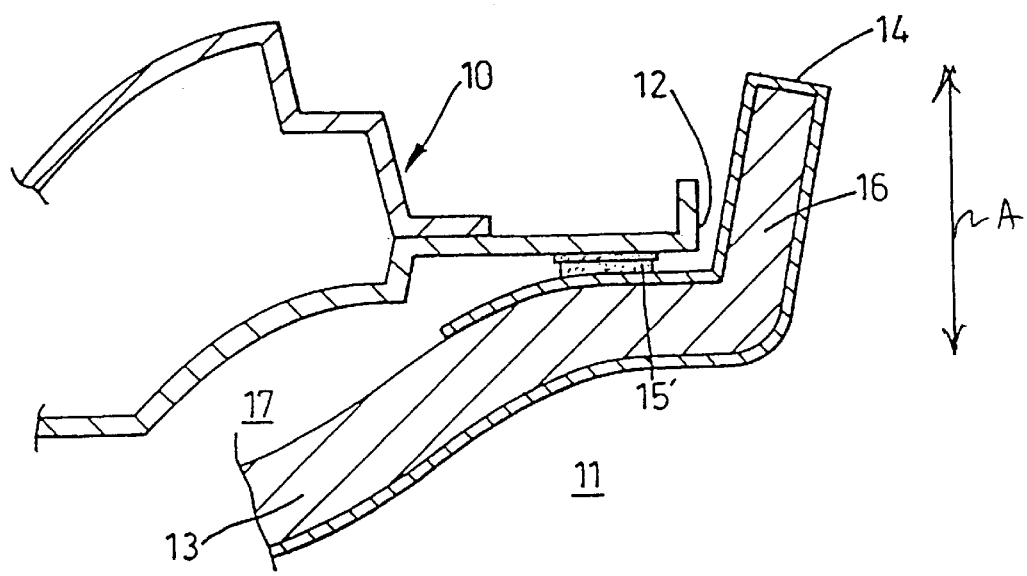

FIG. 3 shows an arrangement in which the hook and loop adhesive coupling means 15' includes an activatable adhesive (only diagrammatically shown) to supplement retention of the roof line or about the roof aperture by providing interaction of the components of the hook and loop adhesive coupling means 15'. It is to be appreciated that the activatable adhesive may be, for example, a micro-encapsulated adhesive distributed within the coupling means and activated upon a percussive compression of the coupling means could be utilized. Alternatively, the activatable adhesive can be either a heat-activated adhesive, a solvent-activated adhesive or a light-activated adhesive.

The seal arrangement in accordance with the present invention generally retains the liner 13 relative to the motor vehicle body 10. Further, seal elements will be provided in association with the body 10 and the sunroof mechanism to provide weatherproofing.

An additional beneficial feature of the present invention is that the hook and fleece adhesion coupling 15 about the aperture 12 may be broken in order to gain access to wiring and other features located within any interspacing 17 between the liner 13 and the body 10. Thus, maintenance, repair and installation of further electrical wiring may be much easier.

It will be appreciated that the hook and fleece coupling 15 could be continuous about the complete periphery of the aperture 12. Alternatively, strips of appropriate components to form a coupling 15 may be provided. These strips may be continuous or discontinuous about the periphery of the aperture. Furthermore, the hook and fleece coupling 15 could incorporate a micro-encapsulated adhesive or powder which upon appropriate activation, eg. heating or rupture compression could distribute an appropriate adhesive between the body 10 and the lining 13 to provide further retention between the body 10 and liner 13.

What is claimed is:

1. A seal arrangement for a motor vehicle body to retain a motor vehicle roof liner about a sunroof aperture provided in the vehicle body, the arrangement comprising flange edge means extending from said roof liner, said flange edge means being configured about and through the sunroof aperture and said flange edge means being adjacent one half of a hook and loop coupling means while said other half of said coupling means is secured to said body proximate and about said aperture to retain said flange edge means in said configuration about and through said aperture to provide a proximity seal between said liner and said sunroof aperture;

wherein at least a portion of said hook and loop coupling means is arranged to extend in the direction of the aperture between said flange edge means and said aperture in order to provide for preliminary location for said roof liner within said aperture and provide a proximity between said aperture and said liner.

2. An arrangement as claimed in claim 1, wherein said flange edge means extends sufficiently beyond said aperture in order to provide a lateral location keying for said roof liner within said motor vehicle body.

3. An arrangement as claimed in claim 1, wherein said hook and loop coupling means is arranged substantially in a plane displaced from that of the aperture in order to provide a wide range of operative overlap between the hook and loop components of said coupling means.

4. An arrangement as claimed in claim 1, wherein said hook and loop coupling means includes activatable adhesive to supplement retention of said roof liner about said roof aperture provided by interaction of the hook and loop coupling means.

5. An arrangement as claimed in claim 4, wherein said activatable adhesive comprises micro-encapsulated adhesive distributed within said coupling means and activatable upon percussive compression of that coupling means.

6. An arrangement as claimed in claim 4, wherein said adhesive is a heat-activated or solvent-activated or light-activated adhesive.

7. A seal arrangement for a motor vehicle body to retain a motor vehicle roof liner about a periphery of a sunroof aperture formed within the vehicle body, the seal arrangement comprising flange edge extending from an end portion of said roof liner, said flange edge being configured to extend through and conform to the sunroof aperture, a vehicle body engaging surface of the flange edge carrying one of a hook fastener and a loop fastener, adjacent the end portion of the flange edge, while the other of the hook fastener and loop fastener being secured to a flange edge engaging surface of said vehicle body proximate and extending about a perimeter of said sunroof aperture, and engagement of the hook fastener and the loop fastener with one another retains said flange edge extending through and conforming to the sunroof aperture and thereby provides a proximity seal between said roof liner and said sunroof aperture.

8. The seal arrangement as claimed in claim 7, wherein said flange edge extends sufficiently beyond said sunroof aperture in order to provide a lateral location component for said roof liner within said aperture of the motor vehicle.

9. The seal arrangement as claimed in claim 7, wherein a longitudinal axis extends through the sunroof aperture and at least a portion of the hook fastener and the loop fastener is arranged substantially perpendicular to the longitudinal axis in order to provide a wide range of operative overlap between the hook and loop fasteners.

10. The seal arrangement as claimed in claiming 7, wherein at least a portion of said hook and loop fasteners is arranged to extend in the sunroof aperture, between the flange edge and said sunroof aperture, in order to provide for preliminary location for said roof liner within said aperture.

11. The seal arrangement as claimed in claim 7, wherein at least a portion of said hook and loop fasteners is arranged to extend in the sunroof aperture, between the flange edge and said sunroof aperture, in order to provide proximity between said aperture and said roof liner.

12. The seal arrangement as claimed in claim 7, wherein said hook and loop fasteners includes an an activatable adhesive to supplement retention of said roof liner about said roof aperture by interaction of the hook and loop fasteners.

13. The seal arrangement as claimed in claim 12, wherein said activatable adhesive is one of one of a heat-activated, a solvent-activated and a light-activate adhesive.

14. The seal arrangement as claimed in claim 12, wherein said activatable adhesive comprises a micro-encapsulated adhesive distributed within said hook and loop fasteners which is activatable upon percussive compression of said hook and loop fasteners.

* * * * *